Oct. 8, 1940.  E. F. SMITH  2,217,139
TIRE TOOL
Filed Jan. 19. 1939
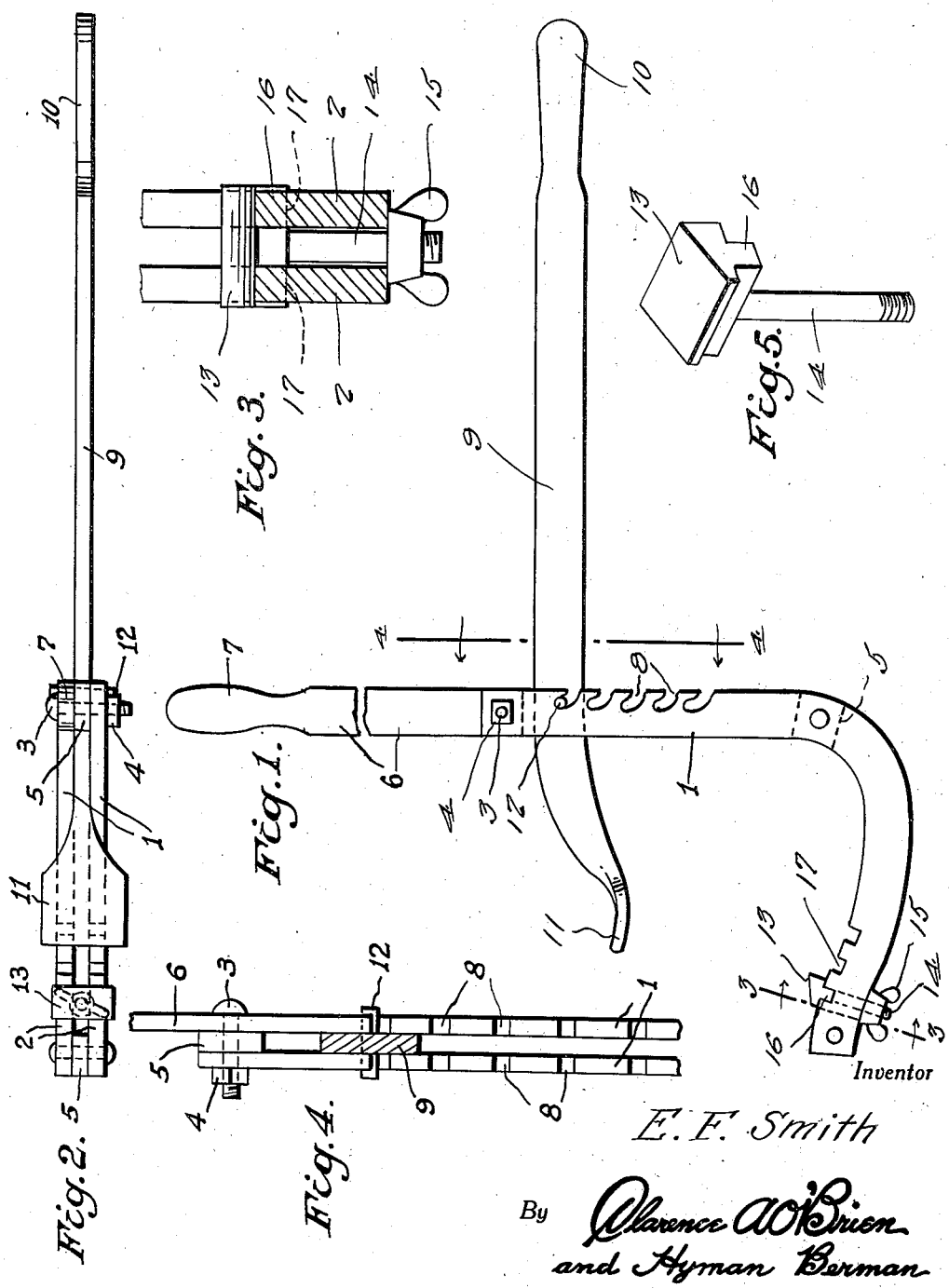
Inventor
E. F. Smith
By Clarence A. O'Brien
and Hyman Berman
Attorneys Patented Oct. 8, 1940

2,217,139

UNITED STATES PATENT OFFICE 2,217,139

TIRE TOOL

Ernest Franklin Smith, Edgar, Nebr.

Application January 19, 1939, Serial No. 251,808

1 Claim. (Cl. 157—6)

The present invention relates to new and useful improvements in tire tools and has for its primary object to provide, in a manner as hereinafter set forth, a device of this character comprising novel means for compressing or collapsing deflated pneumatic tires in a manner to facilitate the removal thereof from drop center rims.

Another very important object of the invention is to provide a tool of the aforementioned character which is adapted to be expeditiously adjusted for different sizes of tires.

Other objects of the invention are to provide a tire tool of the chaarcter described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of a tire tool constructed in accordance with the present invention.

Figure 2 is a plan view thereof.

Figure 3 is a cross sectional view on an enlarged scale, taken substantially on the line 3—3 of Fig. 1.

Figure 4 is a cross sectional view, taken substantially on the line 4—4 of Fig. 1.

Figure 5 is a detail view in perspective of the adjustable rim engaging lug.

Referring now to the drawing in detail, it will be seen that the embodiment of the invention which has been illustrated comprises a pair of spaced, parallel bars 1 of suitable metal. Extending from one end of the bars 1 are integral hooks 2. Bolts 3 which are provided with nuts 4 secure the bars 1 and the hooks 2 together. The reference numeral 5 designates spacers between the bars 1 and between the hooks 2. One of the bars 1 includes a longitudinal extension 6 on one end which terminates in a handle 7.

The bars 1 have formed therein longitudinally spaced, curved slots or notches 8. The notches 8 in the bars 1 are transversely aligned. Pivotally mounted between the bars 1 is a lever 9 having a handle 10 on one end. At its other end, the lever 9 terminates in a foot 11 which is engageable with the outer side wall of a tire (not shown). Mounted transversely in the lever 9 at an intermediate point is a pivot pin 12 which is selectively engageable in the notches 8 for mounting said lever for swinging movement between the bars 1.

Adjustably mounted on the free end portions of the hooks 2 is a rim engaging lug 13 of suitable metal. The lug 13 is mounted on a shank 14 which passes between the hooks 2 and which has threaded thereon a wing nut 15. Formed on the lug 13 is a rib 16 which is engageable selectively in spaced notches 17 which are provided therefor in the hooks 2 for securing said lug in adjusted position in conjunction with the wing nut 15.

It is thought that the manner in which the tool functions will be readily apparent from a consideration of the foregoing. Briefly, the hooks 2 are passed over the tire to be removed and the lug 13 is engaged beneath the inner flange of the rim. Then, by swinging the lever 9 rearwardly the foot portion 11 thereof is swung forwardly or toward the tire. Thus, the tire is compressed or collapsed and may be removed from the rim with a minimum of effort. As hereinbefore mentioned, the foot portion 11 of the lever 9 engages the outer side wall of the tire. By adjusting the lug 13 and the lever 9 the device is readily adapted for use on different sizes of tires.

It is believed that the many advantages of a tire tool constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A tire tool comprising a pair of opposed bars connected in spaced relation, a hook on one end of each bar, said hooks being connected in spaced relation and having spaced notches in the inner sides thereof, a rim engaging lug adjustably mounted on the hooks and including a rib engageable selectively in the notches, a shank on the lug extending through the space between the hooks, a retaining nut threaded on said shank, and a hand lever mounted for swinging movement on the bars and engageable with a tire.

ERNEST FRANKLIN SMITH.